United States Patent
Morris et al.

(10) Patent No.: US 10,316,670 B2
(45) Date of Patent: Jun. 11, 2019

(54) HOLLOW BLADE HAVING INTERNAL DAMPER

(71) Applicant: United Technologies Corporation, Farmington, CT (US)

(72) Inventors: Robert J. Morris, Portland, CT (US); Barry K. Benedict, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 346 days.

(21) Appl. No.: 15/038,090

(22) PCT Filed: Dec. 4, 2014

(86) PCT No.: PCT/US2014/068591
§ 371 (c)(1),
(2) Date: May 20, 2016

(87) PCT Pub. No.: WO2015/085078
PCT Pub. Date: Jun. 11, 2015

(65) Prior Publication Data
US 2016/0319669 A1 Nov. 3, 2016

Related U.S. Application Data

(60) Provisional application No. 61/912,293, filed on Dec. 5, 2013.

(51) Int. Cl.
*F01D 5/16* (2006.01)
*F01D 5/14* (2006.01)

(52) U.S. Cl.
CPC .............. *F01D 5/16* (2013.01); *F01D 5/147* (2013.01); *F05D 2220/323* (2013.01); *F05D 2240/30* (2013.01); *F05D 2250/22* (2013.01); *F05D 2250/23* (2013.01); *F05D 2250/231* (2013.01); *F05D 2260/96* (2013.01); *Y02T 50/672* (2013.01)

(58) Field of Classification Search
CPC ........ F01D 5/16; F01D 5/147; F05D 2260/96; F05D 2250/23; F05D 2250/22; F05D 2250/231; F05D 2220/323; F05D 2240/30; Y02T 50/672
See application file for complete search history.

(56) References Cited

U.S. PATENT DOCUMENTS 1,833,754 A * 11/1931 Paget ................. F01D 5/16
 416/215
2,349,187 A * 5/1944 Meyer ................. F01D 5/16
 188/322.5

(Continued)

OTHER PUBLICATIONS

EP search report for EP14867499.7 dated Jan. 4, 2017.

*Primary Examiner* — Carlos A Rivera
*Assistant Examiner* — Adam W Brown
(74) *Attorney, Agent, or Firm* — O'Shea Getz P.C.

(57) ABSTRACT

A hollow blade of a gas turbine engine has a sacrificial elongated damper disposed slideably in a chamber for minimizing modes of vibration during operation. The chamber is defined between two opposing surfaces generally spanning radially outward from an axis of the engine and a face facing radially inward. The damper is constructed and arranged to make loaded contact with the face via a centrifugal force created by rotation of the engine.

16 Claims, 4 Drawing Sheets

(56) References Cited

U.S. PATENT DOCUMENTS

| | | | | |
|---|---|---|---|---|
| 2,462,961 A * | 3/1949 | Harker | B64C 11/008 | 188/266 |
| 2,862,686 A * | 12/1958 | Bartlett | F01D 5/16 | 416/213 R |
| 3,754,838 A * | 8/1973 | Fu | F01D 5/16 | 416/145 |
| 4,268,223 A * | 5/1981 | Anner | F01D 5/24 | 416/196 R |
| 4,441,859 A * | 4/1984 | Sadler | F01D 5/16 | 416/145 |
| 4,484,859 A * | 11/1984 | Pask | F01D 5/16 | 415/115 |
| 5,232,344 A * | 8/1993 | El-Aini | F01D 5/16 | 416/145 |
| 6,155,789 A * | 12/2000 | Mannava | C21D 10/005 | 29/889.1 |
| 6,478,544 B2 * | 11/2002 | Brandl | F01D 5/22 | 416/190 |
| 6,520,741 B1 * | 2/2003 | Phillipsen | F01D 5/147 | 416/195 |
| 6,827,551 B1 * | 12/2004 | Duffy | F01D 5/16 | 415/119 |
| 9,334,740 B2 * | 5/2016 | Kellerer | F01D 5/16 | |
| 9,957,824 B2 * | 5/2018 | Klinetob | F01D 9/041 | |
| 2002/0164253 A1 | 11/2002 | von Flotow | | |
| 2013/0111907 A1 | 5/2013 | Murdock | | |

\* cited by examiner

HOLLOW BLADE HAVING INTERNAL DAMPER

This application claims priority to PCT Patent Application No. PCT/US14/068591 filed Dec. 4, 2014 which claims priority to U.S. Patent Application No. 61/912,293 filed Dec. 5, 2013, which are hereby incorporated herein by reference in their entireties.

BACKGROUND

The present disclosure relates to a gas turbine engine and, more particularly, to a hollow blade having an internal damper.

Gas turbine engines, such as those that power modem commercial and military aircraft, include a fan section to propel the aircraft, compressor section to pressurize a supply of air from the fan section, a combustor section to burn a hydrocarbon fuel in the presence of the pressurized air, and a turbine section to extract energy from the resultant combustion gases and generate thrust.

The gas turbine engines typically have rows of circumferentially spaced airfoils mounted on respective rotor disks for rotation about an engine axis. Advanced configurations feature shroudless hollow airfoils manufactured with lightweight materials. The airfoils are designed to high tolerances to accommodate significant operational requirements such as cross-winds and inlet distortion. These requirements result in airfoils that may be prone to high vibratory responses and possible aeroelastic instability within some operational speed ranges. To mitigate these effects, the airfoils may need to be damped.

One such damper is shown in U.S. Pat. No. 5,232,344, filed Jan. 17, 1992, where the damper operates under a centrifugal force that biases the damper against both a side skin at two transversely spaced locations of the airfoil and an airfoil face that faces radially inward. With more contemporary turbine engines, such as a geared turbine fan engine, slow fan running speeds are more common thus enabling production of aluminum alloy fan blades. Dampers, especially those that contact the aluminum blade skin at selected transverse locations, may be prone to causing unwanted wear on the blade itself.

SUMMARY

A hollow blade of a gas turbine engine according to one non-limiting embodiment of the present disclosure includes a first surface, a second surface opposed to and spaced from the first surface by a first distance, a face facing radially inward and spanning between the first and second surfaces, a chord-wise chamber defined at least in part by the first and second surfaces and the face, an elongated damper disposed slidably in the chamber and having a first thickness taken generally normal to the surfaces that is less than the first distance, and wherein the damper is under the influence of a centrifugal force that places the damper in a loaded contact against the face.

In the alternative or additionally thereto, in the foregoing embodiment the damper is not in loaded contact with the first and second surfaces when under the influence of the centrifugal force.

In the alternative or additionally thereto, in the foregoing embodiment the hollow blade includes a retention member projecting into the chamber from one of the first and second surfaces and for retaining the damper in a radially outward portion of the chamber.

In the alternative or additionally thereto, in the foregoing embodiment the damper has a second thickness taken generally radially with respect to the blade, and the retention member is spaced radially from the face by a second distance that is greater than the second thickness.

In the alternative or additionally thereto, in the foregoing embodiment the retention member is elongated and disposed substantially parallel to the damper.

In the alternative or additionally thereto, in the foregoing embodiment the damper is made of a softer material than the face, and the first and second surfaces.

In the alternative or additionally thereto, in the foregoing embodiment the face is carried by a tip portion of the blade.

In the alternative or additionally thereto, in the foregoing embodiment the blade is a fan blade and composed generally of an aluminum alloy and the damper is made of a softer material.

In the alternative or additionally thereto, in the foregoing embodiment the damper is cylindrical having a first diameter that is equal to the first thickness.

In the alternative or additionally thereto, in the foregoing embodiment the face is generally cylindrical having a second diameter that is about equal to the first distance.

In the alternative or additionally thereto, in the foregoing embodiment the blade is a fan blade for a geared turbofan engine and composed generally of an aluminum alloy and the damper is made of a softer material.

In the alternative or additionally thereto, in the foregoing embodiment the blade is a fan blade and the damper is made of a composite material.

In the alternative or additionally thereto, in the foregoing embodiment a lateral cross section of the damper is substantially orthogonal.

A hollow blade of a gas turbine engine according to another non-limiting embodiment of the present disclosure includes a first surface, a second surface opposed to and spaced from the first surface by a first distance, a face facing radially inward and spanning between the first and second surfaces, a chamber defined at least in part by the first and second surfaces and the face, an elongated sacrificial damper disposed in the chamber and having a first thickness taken generally normal to the surfaces that is less than the first distance, and wherein the damper is under the influence of a centrifugal force that places the damper in a loaded contact against the face.

In the alternative or additionally thereto, in the foregoing embodiment an anti-node of at least one of the modes of vibration is at the location of the damper.

In the alternative or additionally thereto, in the foregoing embodiment the hollow blade further includes a leading edge, with the chamber being adjacent to the leading edge.

A method of reducing mode vibrations in a hollow blade of a gas turbine engine according to another non-limiting embodiment of the present disclosure includes the steps of fitting a damper slidably in a chamber defined by opposing surfaces and a face of the blade, rotating the blade about an axis of the engine thereby creating a centrifugal force, biasing the damper against a radially inward facing face of the blade via the centrifugal force, and wearing the surface of the damper as oppose to the opposing surfaces and the face of the blade.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
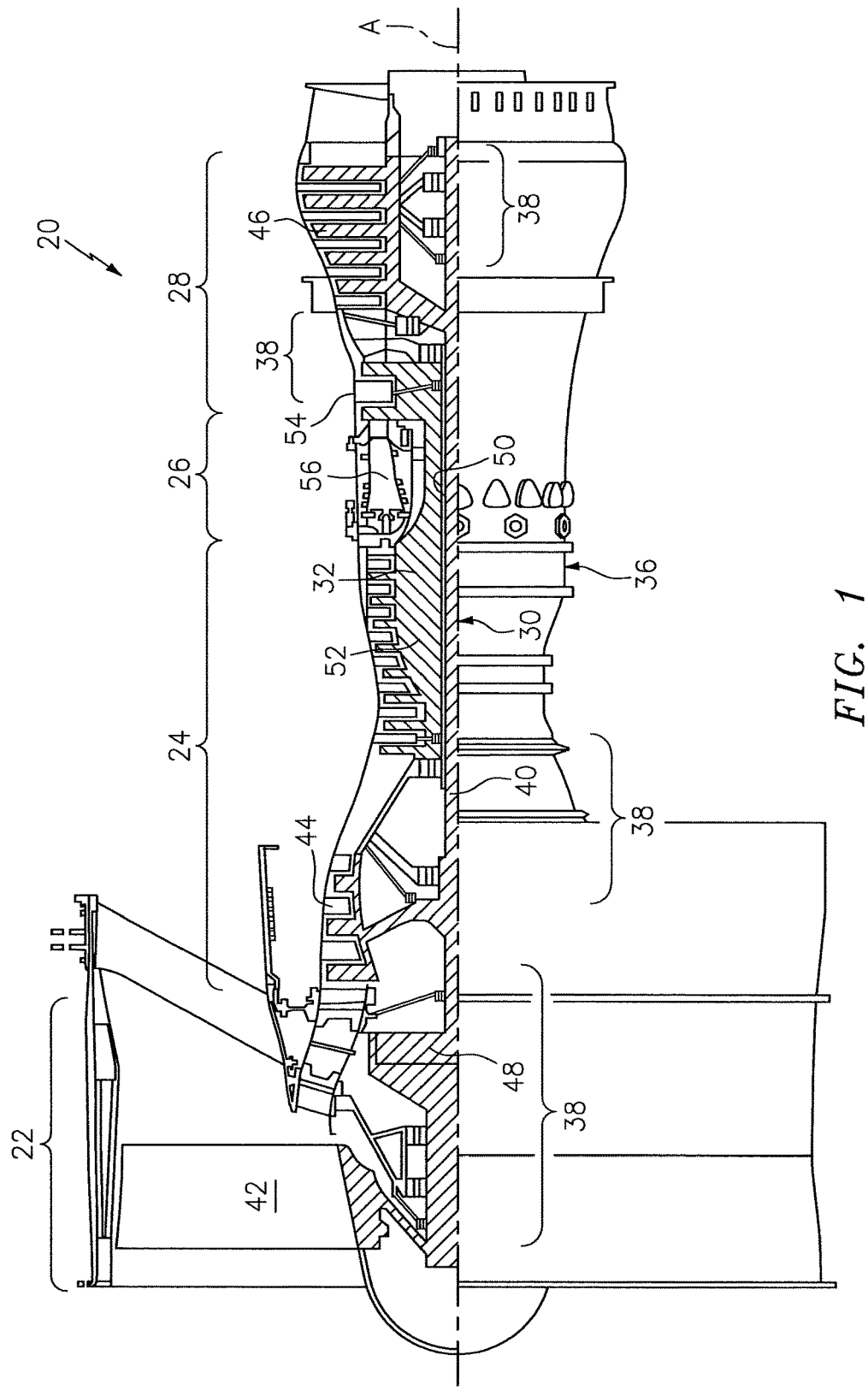
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, the LPC 44 of the compressor section 24 and the LPT 46 of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects the HPC 52 of the compressor section 24 and the HPT 54 of the turbine section 28. A combustor 56 of the combustor section 26 is arranged between the HPC 52 and the HPT 54. The inner shaft 40 and the outer shaft 50 are concentric and rotate about the engine axis A that is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7$^{0.5}$) in which "T" represents the ambient temperature in degrees Rankine. The Low Corrected Fan Tip Speed according to one non-limiting embodiment of the example gas turbine engine 20 is less than about 1150 fps (351 m/s).

Figure 4:
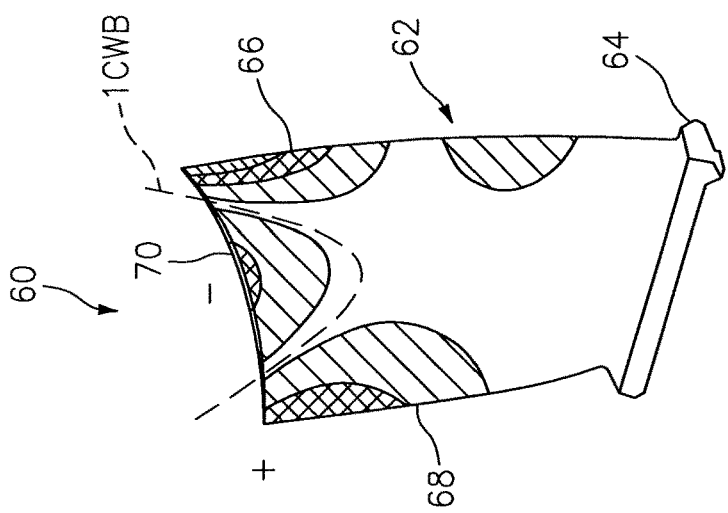
FIG. 4 is a perspective view of the fan blade.
Figure 3:
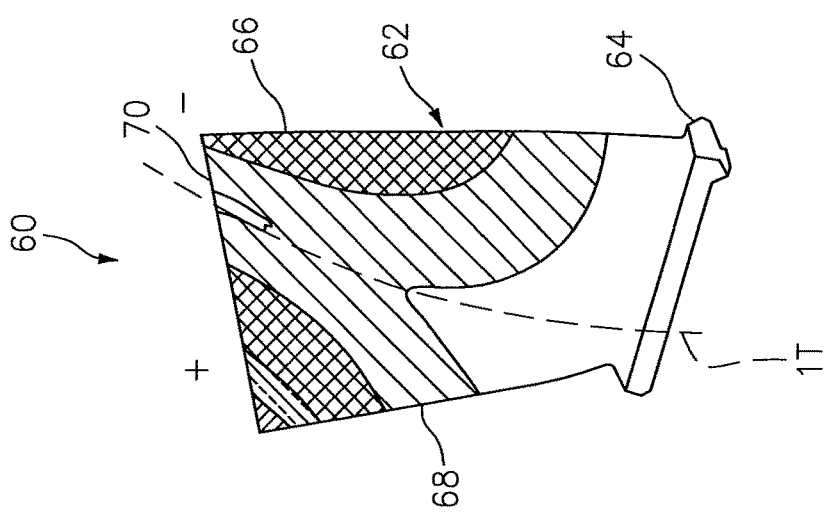
FIG. 3 is a perspective view of the fan blade.
Figure 2:
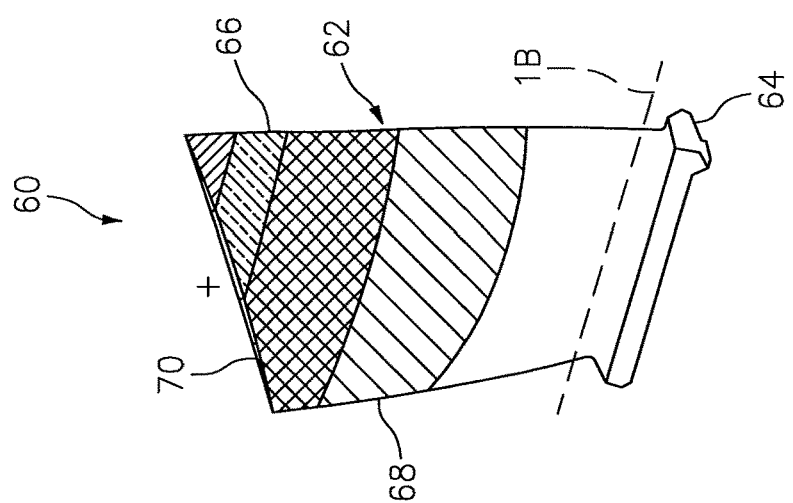
FIG. 2 is a perspective view of a fan blade of the engine.

Referring to FIGS. 1 through 3, a fan blade 60 has a hollow airfoil 62 projecting radially outward from a platform 64. The airfoil 62 spans chordwise between leading and trailing edges 66, 68 (with respect to fan flow), and radially from the platform 64 to a blade tip portion 70. The airfoil 62 generally has several modes of vibration during operation including: a first bending signified by node line 1B (FIG. 2), a first torsion signified by node line 1T (FIG. 3) and a first chordwise bending signified by node line 1CWB (FIG. 4). For each mode of vibration, each node line 1B, 1T, 1CWB represents the general area of minimal bending movement with movement generally increasing at locations further out from each respective node line. These locations of maximum movement are the anti-nodes of the respective modes of vibration.

Figure 5:
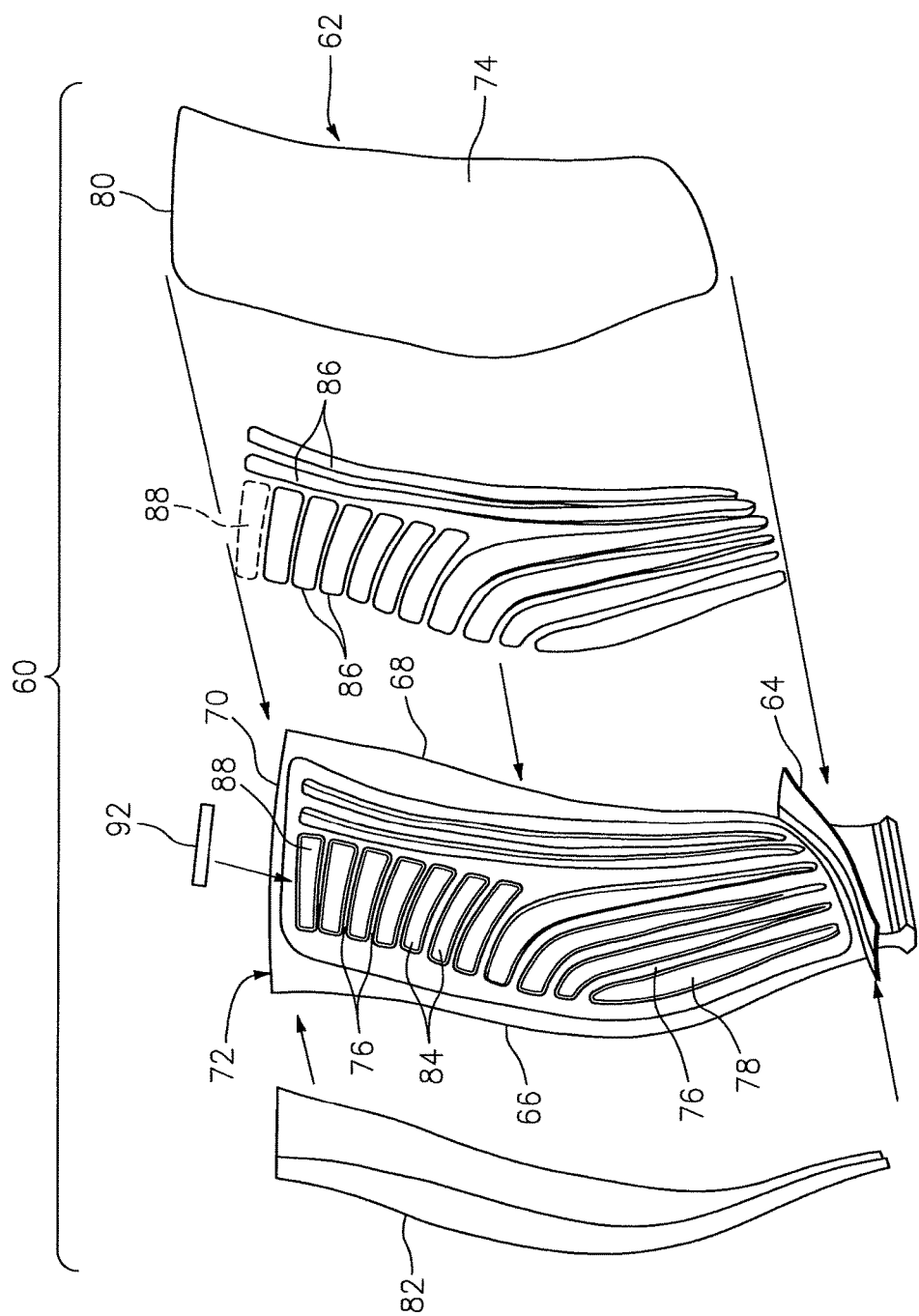
FIG. 5 is an exploded perspective view of the fan blade.

Referring to FIG. 5, the airfoil 62 of the fan blade 60 in the present example has opposite suction and pressure side panels 72, 74 both spanning chordwise between the leading and trailing edges 66, 68 and radially between the platform 64 and airfoil tip portion 70. The suction side panel 72 has a plurality of ribs 76 projecting outward from an inner surface 78 for adding rigidity to the airfoil 62 and orientated such to minimize the modes of vibration and to improve blade impact resistance. The pressure side panel 74 also carries an inner surface 80 that opposes the inner surface 78. The pressure side panel 74 may, for example, be adhered to the suction side panel 72 and ribs 76 by an adhesive. Other bonding materials and means may also be applied such as an epoxy material. The blade 60 may be made of an aluminum alloy with a titanium sheath 82 adhered to and protecting the leading edge 66 of the airfoil 62. Although not shown, it is understood that the ribs 76 may alternatively project from the pressure side panel 74.

Figure 6:
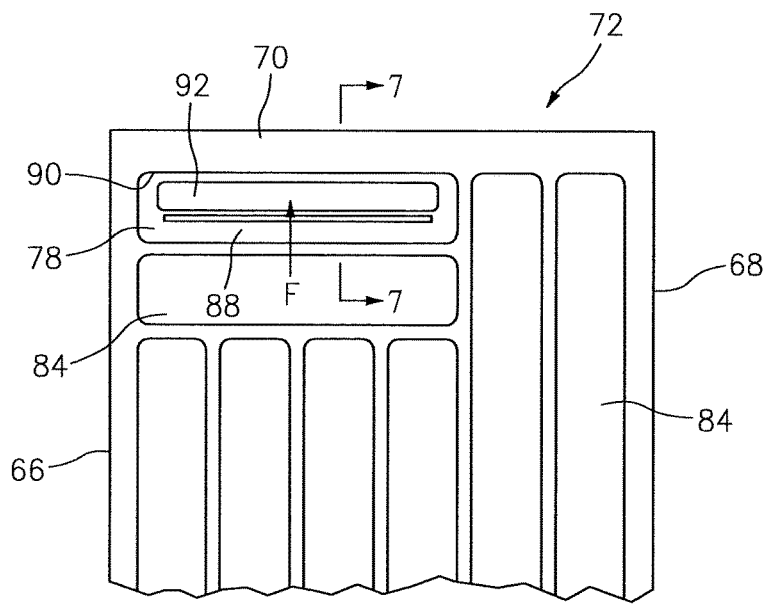
FIG. 6 is a partial plan view of an airfoil of the fan blade with a portion removed to show internal detail.
Figure 7:
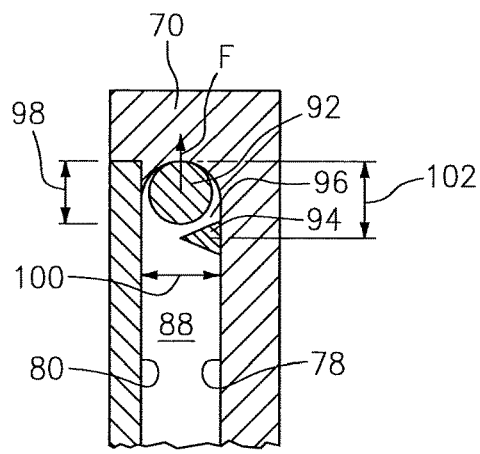
FIG. 7 is a cross section of the airfoil taken along line 7-7 of FIG. 6.

Referring to FIGS. 5 through 7, and with the blade 60 assembled, the opposing surfaces 78, 80, and ribs 76 define a plurality of first chambers 84, each filled with a foam filler 86 that may be made of aluminum. A second chamber 88 may be defined by opposing surfaces 78, 80, ribs 76 and a face 90 facing radially inward from and carried by the blade tip portion 70. The second chamber 88 may not be filled with a foam and, instead, chamber 88 loosely houses a sacrificial damper 92. Both chamber 88 and damper 92 may be elongated in a chordwise direction and positioned such that both substantially encompass the anti-node 1CWB (see FIG. 4) for damping the first chordwise bending. That is, the anti-node of the 1CWB intersects the longitude of the chamber 88 and damper 92 at approximately mid-span.

Referring to FIG. 7, an elongated retention member 94 projects laterally outward from the inner surface 78 and into chamber 88 for loosely retaining the damper 92 in a radially outward portion 96 of chamber 88. The damper 92 is disposed slideably and radially between the face 90 and retention member 94, with respect to axis A. The damper 92 may be a rod having a diameter 98, and the face 90 may have a convex contour that may be substantially cylindrical having a radius that is substantially half a distance 100 between opposing surfaces 78, 80. The face 90, damper 92 and retention member 94 co-extend longitudinally and are substantially parallel to one-another with a distance 102 measured from the face 90 to the retention member 94 being greater than the diameter 100 of the damper 92.

With the blade 60 fully assembled and prior to normal operation, the damper 92 is generally free to move about within the outward portion 96 of chamber 88 both in an axial and radial direction with respect to axis A. During normal operation, rotation of the fan section 22 places a centrifugal force F upon the damper 92 that biases the damper radially outward and against the face 90 causing a loaded contact that is continuous along the full length of the damper. The mass and stiffness of the damper 92 is designed and controlled to provide the maximum amount of additional hysteretic damping from the relative chordwise displacement of the vibrating blade 60 and the non-vibrating damper. The retention member 94 keeps the damper 92 in the chamber portion 96 when the engine 20 is shutdown.

In the present example, the engine 22 is a geared turbo fan generally operating at lower fan speeds than more traditional engines. The slower fan speeds and subsequent reduced stress enable use of less expensive alloys for blades (e.g. aluminum alloy) and use of hollow configurations that together reduce weight. However, modes of vibration as previously described remain present and are mitigated through the use of damper 92. Furthermore, damper 92 may be sacrificial in the sense that the damper is designed to wear before wear occurs to the internal panel surfaces 78, 80 or face 90 of the blade 60. Therefore, the damper 92 may be of a softer material that still possess the degree of stiffness required to minimize mode vibration. Such materials may be a softer aluminum alloy or a composite material. The cylindrical shape of the damper 92 and the ability of the damper to rotate about within chamber portion 96 between operational periods promotes an even wear of the damper contact surface; and, the wear itself assists in the continuous load contact with face 90 during operation.

It is further understood that any one of the foam filled chambers 84 can be substituted for chamber 88 with the outboard rib 76 of that chamber carrying the face 90. The damper 92 may reduce any one of the modes of vibration or combinations thereof, provided that the damper and chosen chamber housing the damper extend through one or more of the respective anti-nodes of 1B, 1T, 1CWB (see FIGS. 2-4).

Figure 8:
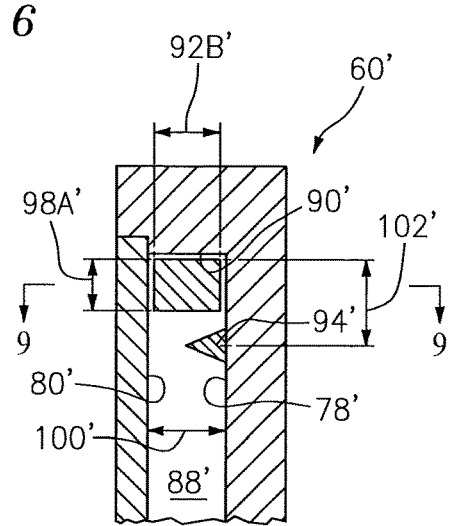
FIG. 8 is a second example of a fan blade similar in perspective to FIG. 7.
Figure 9:
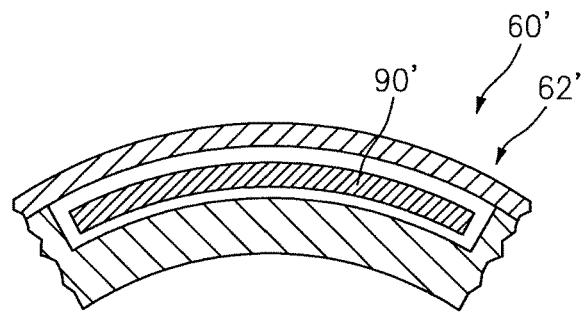
FIG. 9 is a cross section of the fan blade taken along line 9-9 of FIG. 8.

Referring to FIGS. 8 and 9, an alternative example, of the blade and internal damper is illustrated wherein similar elements to the first example have similar identifying numerals except with the addition of a prime symbol. In this second example, a blade 60' has a damper 92' having a lateral cross section profile that is substantially orthogonal (e.g. square or rectangular) with the corners rounded to prevent snagging and assist in movement of the damper 92' within the chamber portion 96. The face 90' is substantial planar. The damper 92' has a radial thickness 98A', with respect to axis A, that is less than a distance 102' between face 90' and retention member 94'. A chordwise thickness 92B' of damper 92' is less than a distance 100' measured between surfaces 78', 80'. The longitude of the damper 92' may not be linear and instead may mimic or simulate a curvature of the airfoil 62'.

It should be understood that relative positional terms such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A hollow blade of a gas turbine engine comprising:
a first surface;
a second surface opposed to and spaced from the first surface by a first distance;
a face facing radially inward and spanning between the first and second surfaces;

a chord-wise chamber defined at least in part by the first and second surfaces and the face;

an elongated damper disposed slidably in the chamber and having a first thickness taken generally normal to the surfaces that is less than the first distance; and wherein the damper is under the influence of a centrifugal force that places the damper in a loaded contact against the face, and the damper is made of a softer material than the face, and the first and second surfaces.

2. The hollow blade of claim 1 wherein the damper is not in loaded contact with the first and second surfaces when under the influence of the centrifugal force.

3. The hollow blade of claim 1 further comprising a retention member projecting into the chamber from one of the first and second surfaces and for retaining the damper in a radially outward portion of the chamber.

4. The hollow blade of claim 3 further comprising:

the damper having a second thickness taken generally radially with respect to the blade; and, wherein the retention member is spaced radially from the face by a second distance that is greater than the second thickness.

5. The hollow blade of claim 4 wherein the retention member is elongated and disposed substantially parallel to the damper.

6. The hollow blade of claim 1 wherein the face is carried by a tip portion of the blade.

7. The hollow blade of claim 1 wherein the blade is a fan blade and composed generally of an aluminum alloy.

8. The hollow blade of claim 4 wherein the damper is cylindrical having a first diameter that is equal to the first thickness.

9. The hollow blade of claim 8 wherein the face is generally cylindrical having a second diameter that is about equal to the first distance.

10. The hollow blade of claim 9 wherein the blade is a fan blade for a geared turbofan engine and composed generally of an aluminum alloy.

11. The hollow blade of claim 1 wherein the blade is a fan blade and the damper is made of a composite material.

12. The hollow blade of claim 4 wherein a lateral cross section of the damper is substantially orthogonal.

13. A hollow blade of a gas turbine engine comprising:

a first surface;

a second surface opposed to and spaced from the first surface by a first distance;

a face facing radially inward and spanning between the first and second surfaces;

a chamber defined at least in part by the first and second surfaces and the face;

an elongated sacrificial damper disposed in the chamber and having a first thickness taken generally normal to the surfaces that is less than the first distance; and, wherein the damper is under the influence of a centrifugal force that places the damper in a loaded contact against the face, wherein the damper is made of a softer material than the face, and the first and second surfaces.

14. The hollow blade of claim 13 wherein an anti-node of at least one of the modes of vibration is at the location of the damper.

15. The hollow blade of claim 14 further comprising:

a leading edge; and, wherein the chamber is adjacent to the leading edge.

16. A method of reducing mode vibrations in a hollow blade of a gas turbine engine comprising the steps of:

fitting a damper slideably in a chamber defined by opposing surfaces and a face of the blade, wherein the damper is made of a softer material than the face and the opposing surfaces;

rotating the blade about an axis of the engine thereby creating a centrifugal force;

biasing the damper against a radially inward facing face of the blade via the centrifugal force; and wearing the surface of the damper as oppose to the opposing surfaces and the face of the blade.

* * * * *